June 2, 1931.  G. C. KENNEDY  1,808,042
ADJUSTABLE LUGGAGE CARRIER
Filed June 17, 1929

INVENTOR
George Colvin Kennedy

Patented June 2, 1931

1,808,042

UNITED STATES PATENT OFFICE

GEORGE COLVIN KENNEDY, OF WATERLOO, IOWA

ADJUSTABLE LUGGAGE CARRIER

Application filed June 17, 1929. Serial No. 371,593.

My invention relates to improvements in luggage carriers for vehicles, particularly for automobiles, and the objects of my improvements are these; first, to supply for a vehicle a sectional carrier having one section bracketed rigidly thereto, and having another section movably connected to the first section, and adapted in one position to be an extension or continuation of the carrier for carrying a maximum load in both bulk and weight, and when in another position to close the outer end of the first section, restricting its capacity, but reducing the size of the projection of the carrier as a whole from the vehicle; second, to connect the movable section to the fixed section swingingly and provide means for supporting said movable section in many different positions relative to the fixed sections, so that in various relatively inclined positions the movable member will serve to suitably fit and carry loads of any or irregular shapes or content; third, to connect said movable section to the fixed carrier for bodily translation therefrom to increase the length of the carrier; fourth, to make the carrier of a light but strong skeleton construction to save expense and weight thereof to be carried, and to be readily fitted upon or removed from a vehicle, and quickly adjusted in the relations of any of its parts.

Figure 1:
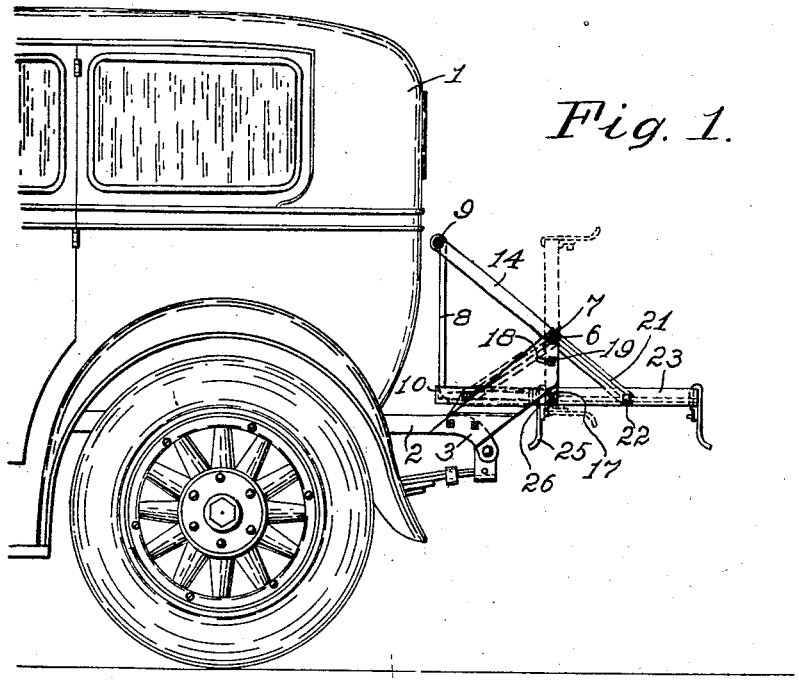
Figure 2:
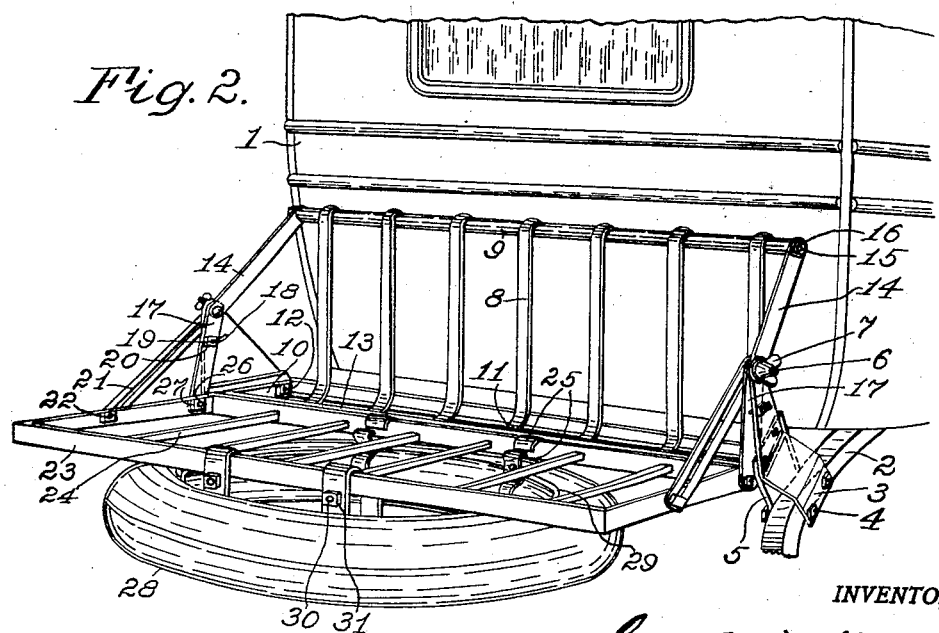

These objects I have accomplished by the means which are hereinafter described and claimed, and which are illustrated in the accompanying drawings, in which Fig. 1 is a side elevation of my improved carrier as bracketed upon the rear part of an automobile, with its movable section lowered to increase its length, the dotted lines showing the movable section when raised to a vertical position to shorten and inclose the carrier as a whole, while leaving it still a load carrier. Fig. 2 is a perspective view of the carrier as thus mounted upon an automobile, on a larger scale, and having its movable section extended to lengthen the carrier.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described.

The numeral 1 denotes a passenger automobile having the usual rearwardly projecting frame members 2. Upon these are removably bracketed inclined plate supports 3, which may be of any other shape, and these plates are bent inwardly in offset fashion and are braced by auxiliary plates 5 secured with the plates 3 to said frame members 2 by the same bolts 4.

Positioned immediately to the rear of the automobile 1 is a sectional carrier, of which the front section is fixed to the plate supports 3, the section having a U-shaped bottom frame 10 bolted to said supports 3 by bolts 12. Bars 8 have their rear terminations 11 welded to the middle transverse frame part 13, thence are directed in parallel horizontally toward the automobile thence bent upwardly vertically and welded upon a transverse tube 9 which is traversed by a rod 15. The ends of the rod projects slightly from the tube, are threaded and receive thereon the rearwardly inclined bars 14 secured at the tops by nuts 16. The lower ends of the bars 14 are secured to the tops of the plate supports 3 by a pair of common bolts 6 with wing-nuts 7 which bolts also carry the apertured upper ends of hanger bars 17 and inclined longitudinally slotted bars 21. The lower apertured terminations of the bars 17 are secured to the forward parts of sides of a movable carrier section 23 immediately to the rear of said front section, by bolts 26 and nuts 27.

The rear or movable section is composed of the hollow rectangular frame 23 made of angle-steel of which the forward and rear parts are rigidly connected by parallel bars 24 terminally welded thereto. The lower apertured terminations of the slotted bars 21 are pivoted to the side parts of the frame 23 by bolts 22. The upper bolts 6 are seated through the upper ends of the slots in the bars 21. The plate supports 3 have arcuate slots 18 to receive bolts 19 which traverse holes in the bars 17 and are adjustably secured in the slots by nuts 20.

Clips 25 may be clamped upon the forward and rear parts of the frame 23 by bolts 30 and nuts 31. These clips are used to secure removably the inner rim 29 of a spare tire 28 to the movable section 23 along its under face when lowered, and being to the rear thereof when raised.

When the rear movable section 23 is lowered to a horizontal position it becomes in alinement with and a continuous extension to the rear of the forward fixed section 10. The slotted hanger bars 21 slide down upon the top bolts 6, but it is obvious that the section 23 may be supported at any desired angle of inclination upwardly relative to the section 10 by the clamping actions of the bolts 6 when the section 23 is tilted upwardly. When the section 23 is in horizontal alinement with the section 10, the hangar bars 21 also the sloping plate supports 3 afford side stops for a load upon the combined carrier sections, and as the rear end of the section is without a stop, any load may project rearwardly therefrom a distance. When the section 23 is tilted to a more or less inclined position relative to the fixed section 10, certain bodies may be supported upon both the section 10 and the inclined section 23, whereby the latter becomes at once a carrier and a rear stop. When the section 23 is raised to be perpendicular with the rear part of the fixed section 10, the fixed section 10 nevertheless becomes a carrier of more limited volume but stopped all around except at the top. It is obvious however, that a top closure of any kind may be used for this carrier as so inclosed all around, and when desired the sections, their sides and ends may be imperforate, so that a closed box is formed, without departing from this invention.

In Fig. 1 the dotted lines show the rear section 23 raised vertically, inclosing a carrying space sufficient for many purposes, and lessening the projection of the device to the rear of the vehicle.

In some cases, it is desirable to shift the rear section 23 bodily rearwardly to accommodate some load of a certain size to be carried upon the forward section, such as milk-cans which are of greater diameter than the width of the section. Then the nuts 20 may be loosened, the bars 17 swung outwardly rearwardly over the supports 3, the arcurate slots 18 permitting this adjustment of the swingingly supported section 23 rearwardly, thus lengthening the carrier as a whole, also when desired permitting it to carry a load to be supported throughout. The upright bars 8 of the fixed section 10 also serve as guards for the rear face of the automobile body.

Having described my invention, what I claim as new, and desire to secure by Letters Patent, is:

1. A luggage carrier including a fixed section having a horizontal portion, a movable section, means connecting said sections and arranged to permit the movable section to move bodily in a substantially horizontal path toward and from the fixed section while maintaining substantial coplanar relation therewith, said movable section being pivoted to said means to permit swinging of the movable sections into selected angular position relative to the fixed section, and means to secure the movable section in the selected angular position.

2. A luggage carrier including a fixed section having a horizontal portion, a movable section, links swingingly mounted on the fixed section and having their free ends pivoted to the movable section, to permit free swinging movement of the movable section in a substantially horizontal path toward and from the fixed section while maintaining substantial coplanar relation with the horizontal portion thereof, means to secure said links in adjusted position, said pivotal connection of the movable section and links permitting the movable section to assume desired angular relation to the fixed section, and other means to secure the movable section in selected angularly adjusted position.

3. A luggage carrier having a fixed section including a bottom and sides, a movable section, links having their upper ends pivoted to said sides and depending from the pivot points, means for holding the links in adjustably swung positions, said movable section having the edge portion adjacent the fixed section pivotally connected to the lower ends of said links to swing on the pivot points to any adjusted angular position between vertical and horizontal, and means to hold the movable section in such adjusted angular position.

4. A luggage carrier including a fixed section, a movable section, means connecting said sections and arranged to permit the movable section to move bodily toward and from the fixed section in substantial alinement with the fixed section, said movable section being pivoted to said means to permit swinging of the movable sections into selected angular position relative to the fixed section, and links having bolt and slot connection with the fixed section and having their free ends pivoted to the movable section in spaced relation to the connection of said means and movable section whereby the movable section may be adjusted angularly irrespective of its bodily position relative to the fixed section.

5. A luggage carrier including a fixed section, a movable section links swingingly mounted on the fixed section and having their free ends pivoted to the movable section to permit free swinging movement of the movable section toward and from the fixed section in substantial alinement therewith, means to secure said links in adjusted position, said pivotal connection of the movable section and links permitting the movable section to assume desired angular relation to the fixed section, and other links having bolt and slot connections with the first section and having their free ends pivoted to the movable section in spaced relation to the first links whereby the movable section may be adjusted angularly irrespective of its bodily relation to the fixed section.

6. A luggage carrier including a fixed section having a horizontal portion, a movable section and means connecting said sections and arranged to permit horizontal bodily movement toward and from the fixed section by the movable section while maintaining substantial coplanar relation with said fixed section, said means embodying also means to secure the movable section in angularly and bodily adjusted relation to the fixed section.

In testimony whereof I affix my signature.

GEORGE COLVIN KENNEDY.